(12) United States Patent
Cloos et al.

(10) Patent No.: US 9,334,993 B2
(45) Date of Patent: May 10, 2016

(54) CONNECTING STRUCTURE COMPRISING A HIGH-PRESSURE PIPELINE AND COUPLING

(75) Inventors: Peter Jeroen Cloos, Enkhuizen (NL); Lambertus Gerrit Peter Dalmolen, Amsterdam (NL)

(73) Assignee: PIPELIFE NEDERLAND B.V., Enkhuizen (NL)

( * ) Notice: Subject to any disclaimer, the term of this patent is extended or adjusted under 35 U.S.C. 154(b) by 1466 days.

(21) Appl. No.: 12/243,172

(22) Filed: Oct. 1, 2008

(65) Prior Publication Data

US 2009/0085351 A1    Apr. 2, 2009

(30) Foreign Application Priority Data

Oct. 2, 2007  (NL) ...................................... 2000891

(51) Int. Cl.
*F16L 33/01* (2006.01)
*F16L 33/207* (2006.01)

(52) U.S. Cl.
CPC ............. *F16L 33/01* (2013.01); *F16L 33/2073* (2013.01)

(58) Field of Classification Search
CPC ......... F16L 33/01; F16L 33/22; F16L 33/223; F16L 33/28
USPC ........... 285/222.1, 222.2, 222.3, 222.4, 222.5
See application file for complete search history.

(56) References Cited

U.S. PATENT DOCUMENTS

| | | | |
|---|---|---|---|
| 1,175,532 A * | 3/1916 | Lambkin ....................... | 285/249 |
| 3,415,545 A * | 12/1968 | Frey et al. .................. | 285/222.1 |
| 4,691,740 A * | 9/1987 | Svetlik et al. ................. | 138/109 |
| 5,947,528 A * | 9/1999 | Campbell ........................ | 285/16 |
| 5,992,897 A * | 11/1999 | Hill et al. ......................... | 285/55 |
| 6,478,338 B1 * | 11/2002 | Dalmolen et al. ........... | 285/21.2 |
| 6,923,477 B2 * | 8/2005 | Buon et al. ................. | 285/222.1 |
| 6,938,932 B2 * | 9/2005 | Grepaly et al. ............ | 285/222.2 |
| 7,175,208 B2 * | 2/2007 | Belcher ......................... | 285/249 |

FOREIGN PATENT DOCUMENTS

| | | |
|---|---|---|
| DE | 907 960 | 4/1954 |
| DE | 101 60 379 | 6/2003 |
| GB | 773983 | 5/1957 |
| GB | 880891 | 10/1961 |
| WO | 95/12086 | 5/1995 |
| WO | 95/58894 | 11/1999 |
| WO | 99/58894 | 11/1999 |

OTHER PUBLICATIONS

Inventors: Peter Jeroen Cloos et al., Assignee: Pipelife Nederland B.V., Dutch Search Report dated Jul. 23, 2008, corresponding to Dutch Application No. 2000891.

* cited by examiner

*Primary Examiner* — David E Bochna
*Assistant Examiner* — James Linford
(74) *Attorney, Agent, or Firm* — Young & Thompson

(57) ABSTRACT

A connecting structure includes a high-pressure line having a load-bearing shell and a sealing inner cladding, as well as a coupling, which coupling includes a flange section having a ring part and a flange which extends radially outwards with respect to the ring part, a connecting element by which the load bearing shell of a pipe is connected to the flange section, as well as a sealing element which the inner cladding of the high-pressure line is connected to the flange section, which sealing element end in the free end of the flange section which is turned away from the high-pressure line. The sealing element includes a sealing sleeve which is situated between the inner cladding of the pipe and the ring part of the flange section.

11 Claims, 2 Drawing Sheets

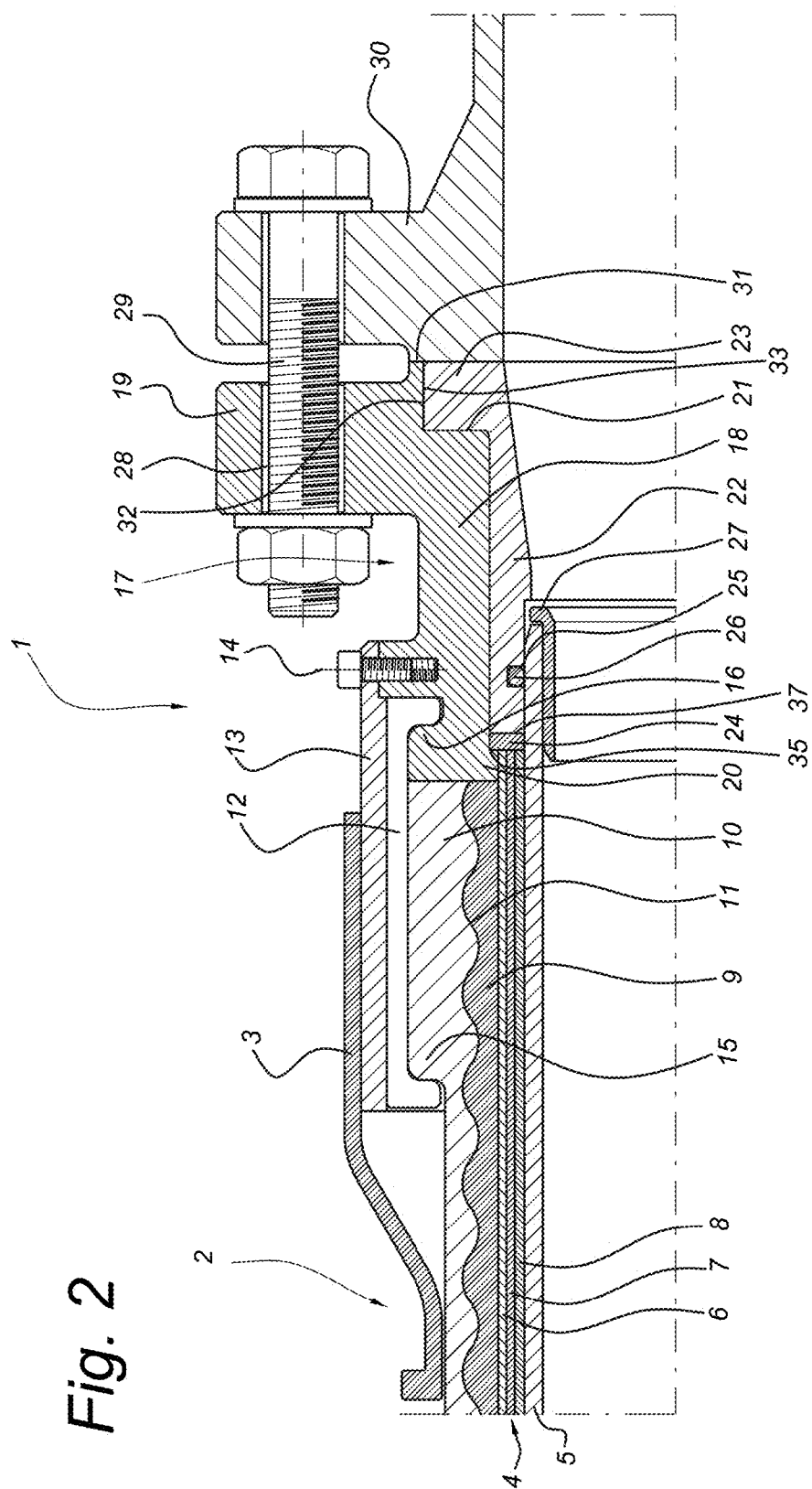

CONNECTING STRUCTURE COMPRISING A HIGH-PRESSURE PIPELINE AND COUPLING

Figure 1:
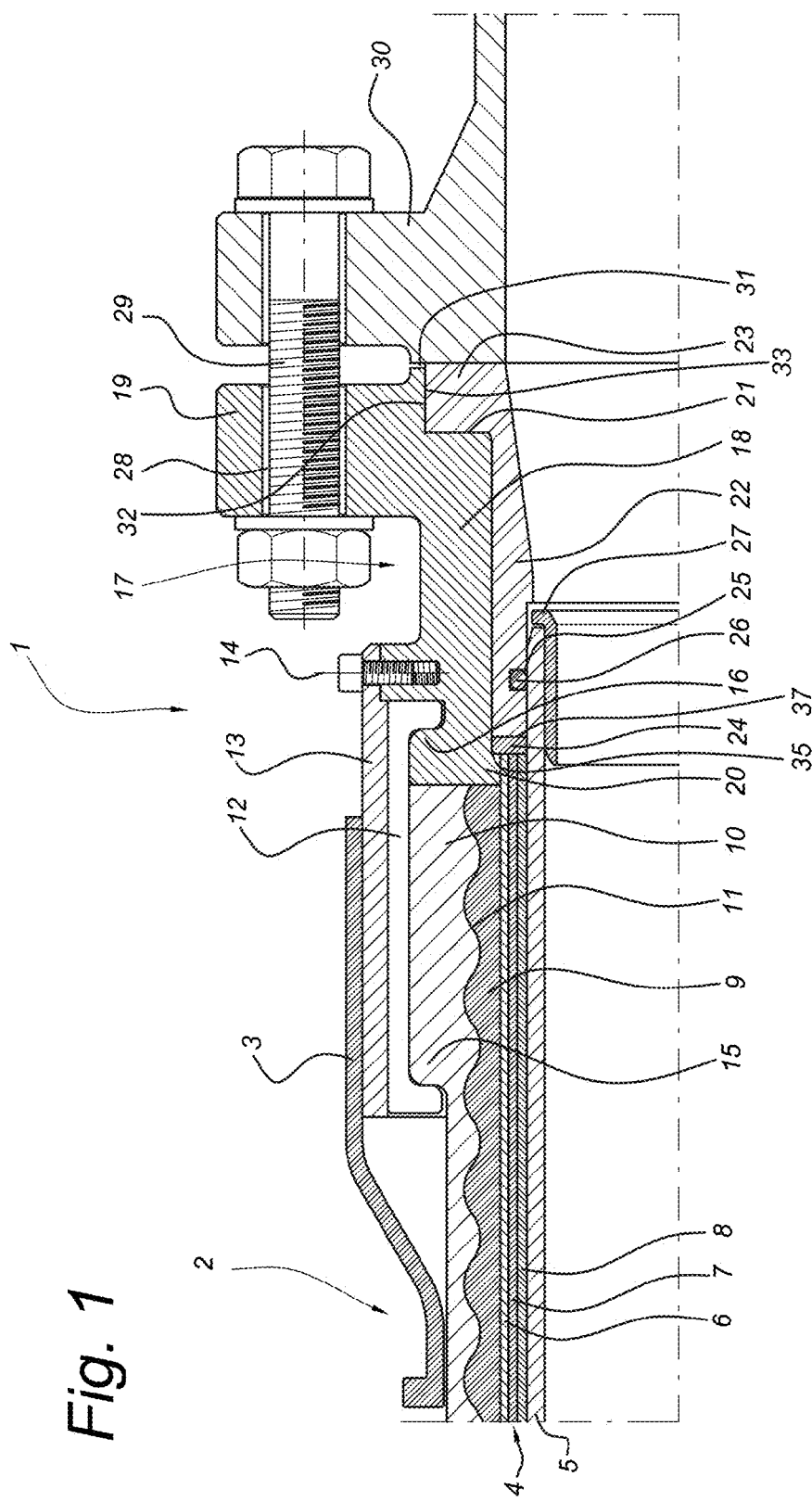

The invention relates to a connecting structure comprising a high-pressure line having a load-bearing shell and a sealing inner cladding, as well as a coupling, which coupling comprises a flange section having a ring part and a flange which extends radially outwards with respect to the ring part, connecting means by means of which the load-bearing shell of a pipe is connected to the flange section, as well as sealing means by means of which the inner cladding of the high-pressure line is connected to the flange section, which sealing means end in the free end of the flange section which is turned away from the high-pressure line.

A connecting structure of this type is known from U.S. Pat. No. 6,478,338. With this known connecting structure, the inner cladding is connected by means of an O-ring to a steel ring which ends in the end face of the flange section. There, a second O-ring is provided by means of which the steel ring, and thereby the flange section, has to be connected in a sealing manner to, for example, a flange-connecting assembly which is positioned mirror-symmetrically.

Although this known connecting structure is suitable for connecting two high-pressure lines in a sealing manner with respect to one another, or for connecting a high-pressure line to a flange provided on a vessel, it also has drawbacks. The most important drawback is that the portion of the steel ring which is situated between the two O-rings is not sufficiently protected with regard to the liquid which is transported through the high-pressure line. This may be aggressive liquids which, for example, are used in the extraction of hydrocarbons. These liquids may contain a relatively high proportion of aggressive substances, such as sulphur. Such substances result in strong corrosion of the steel, which adversely affects the service life of the flange-connecting assembly.

It is therefore an object of the invention to provide a connecting structure of the type described for this purpose which does not have these drawbacks. This object is achieved by the fact that the sealing means comprise a sealing sleeve which is situated between the inner cladding of the pipe and the ring part of the flange section. The sealing sleeve according to the invention is situated on the outer side of the inner cladding layer and protects the ring part, as a result of which the sealing sleeve is better able to isolate the ring part from the substances flowing through the pipe.

A further improvement can be achieved if the sealing means comprise a sealing collar which extends radially outwards with respect to the sleeve. Then, the ring part is also protected on the outside from the liquids in the pipe. In addition, such a sealing collar can act as a gasket, as a result of which an O-ring sealing can be omitted there. If two pipes are connected to one another in a mirror-symmetrical fashion, the gaskets of both connecting structures can then be pressed against one another and sealed, due to the fact that the sealing collars each form a gasket which at least partially covers the free end of the flange section. Preferably, the sealing sleeve and the sealing collar form a single entity made of plastic.

The flange section may have a continuous recess in which the gasket is accommodated. If the sealing gasket projects in the axial direction with respect to a stop face provided on the flange section, a good clamping action and therefore sealing is ensured. In this connection, the flange may be in a position which is recessed with respect to the stop face, in such a manner that the stop faces can determine the correct contact position which is essential for a tight fit and thus sealing of the gaskets.

Furthermore, an annular groove may end on the inner surface of the sealing sleeve, in which annular groove a sealing means, such as an O-ring, is accommodated. In addition, the inner cladding of the pipe may be provided with an inner insert which overlaps the end of the sealing sleeve which is turned towards the pipe in such a manner that the cladding can be pressed against the O-ring in a stable manner.

According to a possible embodiment, the sealing sleeve projects radially inwards with respect to the inner surface of the ring part. In this case, the inner surface of the ring part defines a radially inwardly projecting shoulder (20) which is situated on the end of the ring part (18) which is turned towards the pipe, which shoulder has a stop face (35) which is turned away from the pipe and against which the sealing sleeve stop face (37) rests. Furthermore, a head end of the load-bearing shell of the pipe can in this case rest against the stop face of the shoulder which is turned towards the pipe.

The connecting means may be designed in various ways; in particular they may comprise a coupling bush assembly coupled to the ring part and provided with an inner plastic layer which is connected to the load-bearing shell of the pipe by fusion. By way of example, the plastic layer may be provided with a helically extending heating wire which can be heated by means of electricity.

The coupling bush assembly preferably has concentric coupling bushes which engage with one another by means of toothing, the radially outermost coupling bush of said coupling bushes being attached to the ring part of the flange section and the radially innermost coupling bush of which is connected to the load-bearing shell of the pipe by fusion. The high-pressure line may comprise a cladding layer which surrounds the shell and extends along the coupling bushes.

The invention furthermore relates to a coupling for a high-pressure line having a load-bearing shell and a sealing inner cladding, which coupling comprises a flange section having a ring part and a flange which extends radially outwards with respect to the ring part, connecting means by means of which the load-bearing shell of a pipe can be connected to the flange section, as well as sealing means by means of which the inner cladding of the high-pressure line can be connected to the flange section. The sealing means comprise a sealing sleeve which extends from the flange section along the ring part.

The invention will be explained in more detail below with reference to an exemplary embodiment illustrated in the figure.

The connecting structure shown in the figures is attached to the high-pressure line 2, which comprises, viewed from the outside to the inside, the outer cladding layer 6, the 30 load-bearing shell 4 and the inner cladding 5. The load-bearing shell itself consists of several fibre layers 7 and 8 which have different orientations in connection with the desired stiffness and strength of the pipe. Although a total of two reinforcing layers are shown, it is also possible to use a different number of reinforcing layers, for example four reinforcing layers. An inner coupling bush 9 is bonded to or fused to the loadbearing shell. This coupling bush 9 mates, by means of the toothing 11, with an outer coupling bush 10 which is coupled to the connecting structure 1 by means of the double hooks 12. To this end, the outer coupling bush 10 has a shoulder 15 while the 5 connecting structure 1 also has a shoulder 1 behind which the hooks 12 are hooked. The hooks 12 are secured by casing 13, which is fixed to the connecting structure 1 by the means of bolts 14. The junction between the high-pressure structure line and the connecting structure 1 is covered by means of the head 15.

The connecting structure 1 has a flange section 17, comprising the ring part 18 and the flange 19 extending radially outwards with respect to the ring part. The ring part 18 has a radially extending shoulder 20 as well as an annular recess 21 on the outer end of the connecting structure 1. On the inside of the flange section 17, the sealing sleeve 22 is situated which is provided entirely with the sealing flange 23 which is situated in the recess 21 connecting radially to flange 17 at abutment surfaces 32, 33. The sealing flange 21 projects slightly in the axial direction with respect to the flange 19 of the flange section 17; the sealing sleeve 22 rests against the shoulder 20 by means of the ring 24. The load-bearing shell 4 rests against the other side of the ring 24.

The sealing sleeve has an inner groove 25, in which the O-ring 26 is accommodated. This O-ring 26 provides the sealing between the sealing sleeve 22 and the inner cladding 5 of the pipe 2, which inner cladding 5 axially overlaps the sealing sleeve 22 to this end. In order to ensure a secure contact between the O-ring and the inner cladding 5, an insert 27 is incorporated in the latter.

The flange 19 has holes 28 through which bolts 29 extend in order to connect the pipe 2 to the counterpart 30 by means of the connecting structure 1. This counterpart 30 may, for example, be a mirror-symmetrical connecting structure 1, a flange connected to a vessel, etc. By tightening the bolts 29, the slightly protruding sealing flange 23 is pressed strongly against the counterpart 30, as a result of which a good sealing can be ensured. In this connection, the flange section 17 is provided with a stop 31 which protrudes slightly with respect to the flange 19. As soon as the stop 31 touches the counterpart 30 (see FIG. 2), the desired compression of the sealing flange is achieved.

FIG. 1 shows a gap between the stop surface 31 and the adjacent surface of counterpart 30 prior to the connecting structure being in a final assembled state, whereas FIG. 2 shows the stop surface 31 and the adjacent surface of counterpart 30 touching when the sealing collar is in abutment with the counterpart and the flange section when the connecting structure is in the final assembled state.

As a result of the combined sealing sleeve 22 and sealing flange 23 which are entirely made from plastic, for example polyethylene, the steel of the flange section 17 is well protected against aggressive liquids which flow through the pipe 2.

The invention claimed is:

1. Connecting structure comprising:
a high-pressure line connecting a counterpart,
the high-pressure line having a load-bearing shell and a sealing inner cladding, and
a coupling, said coupling comprising
a flange section having a ring part with an inner ring part surface, a continuous recess having an abutment surface which extends radially outwards with respect to the inner ring part surface, a first stop face provided on an axially outermost end of the flange section, and a flange, the flange extending radially outwards with respect to the ring part and turned away from the high-pressure line,
the load bearing shell being connected to the flange section, and
a sealing element connecting the inner cladding to the flange section,
said sealing element ending in the axially outermost free end of the flange section,
the sealing element comprising
i) a sealing sleeve having an outer sealing sleeve surface and an inner sealing sleeve surface, said sealing sleeve being situated between the inner cladding of the high-pressure line and the ring part of the flange section in such a way that the outer sealing sleeve surface faces the inner ring part surface and the inner sealing sleeve surface faces the cladding, and
ii) a sealing collar which extends radially outwards and which axially protrudes with respect to the outer sealing sleeve surface, said sealing collar having a flat, radially extending sealing surface and forming a gasket which at least partially covers the axially outermost free end of the flange section, and an axially extending outer sealing collar surface, the sealing collar being accommodated in the continuous recess of the flange section and directly resting against the radially extending abutment surface of said continuous recess, said continuous recess being delimited by an axially extending recess surface and the axially extending outer sealing collar surface having a radius which is at most equal to the radius of the axially extending recess surface, and the flat, radially extending sealing surface of the sealing collar projecting in the axial direction beyond the first stop face provided on the axially outermost end of the flange section,
wherein the sealing sleeve and the sealing collar form a single entity made of plastic and
wherein said first stop face is arranged radially beyond and recessed axially with respect to the flat radially extending sealing surface of the sealing collar when the sealing collar is in abutment with the counterpart and the flange section prior to the connecting structure being in a final assembled state, and the first stop face touches the counterpart when the sealing collar is in abutment with the counterpart and the flange section when the connecting structure is in the final assembled state.

2. The connecting structure according to claim 1, in which the flange is in a position which is recessed with respect to the first stop face.

3. The connecting structure according to claim 1, in which an annular groove ends on the inner surface of the sealing sleeve, in which annular groove a sealing means, such as an O-ring, is accommodated.

4. The connecting structure according to claim 1, in which the inner cladding of the line is provided with an inner insert which overlaps the end of the sealing sleeve which is turned towards the high-pressure line.

5. The connecting structure according to claim 1, in which the sealing sleeve projects radially inwards with respect to the inner ring part surface.

6. The connecting structure according to claim 1, in which inner ring part surface has a radially inwardly projecting shoulder situated on an end of the ring part turned towards the line, the projecting shoulder having a shoulder stop face turned away from the high-pressure line and against which a shoulder stop face of the sealing sleeve rests.

7. The connecting structure according to claim 6, in which a head end of the load-bearing shell of the line rests against the shoulder stop face of the sealing sleeve.

8. The connecting structure according to claim 1, in which the sealing element comprises a material which has a degree of resistance against permanent deformation.

9. The connecting structure according to claim 1, in which the sealing element comprises polyamide.

10. A connecting structure comprising:
a coupling; and
a high-pressure line having a load-bearing shell and a sealing inner cladding, and connecting a counterpart;
wherein said coupling comprises:
a flange section having a ring part with an inner ring part surface, a continuous recess having an abutment surface which extends radially outwards with respect to the inner ring part surface, a stop face provided on an axially outermost end of the flange section, and an axially extending outer sealing collar surface, and a flange (19) which extends radially outwards with respect to the ring part and turned away from the high-pressure line, the load bearing shell of the line being connected to the flange section, a sealing element connecting the inner cladding of the high-pressure line to the flange section, the sealing element comprising
- a sealing sleeve which extends along and rests against the ring part, the sealing sleeve having an outer sealing sleeve surface and an inner sealing sleeve surface, said sealing sleeve being situated between the inner cladding of the high-pressure line and the ring part of the flange section in such a way that the outer sealing sleeve surface faces the inner ring part surface and the inner sealing sleeve surface faces the cladding, and
- a sealing collar which extends radially outwards with respect to the outer sealing sleeve surface, said sealing collar having a flat, radially extending sealing surface and forming a gasket which at least partially covers the axially outermost free end of the flange section and directly resting against the radially extending abutment surface of said continuous recess, and the flat, radially extending sealing surface of the sealing collar being accommodated in the continuous recess of the flange section, and the sealing collar projecting in the axial direction beyond the stop face provided on the axially outermost end of the flange section, wherein said continuous recess is delimited by an axially extending recess surface and the axially extending outer sealing collar surface having a radius which is at most equal to the radius of the axially extending recess surface, wherein the sealing sleeve and the sealing collar form a single plastic entity and wherein said stop face is arranged radially beyond and recessed axially with respect to the flat radially extending sealing surface of the sealing collar when sealing collar is in abutment with the counterpart and the flange section prior to the connecting structure being in a final assembled state, and the first stop face touches the counterpart when the sealing collar is in abutment with the counterpart and the flange section when the connecting structure is in the final assembled state.

11. A connecting structure, comprising:

a counterpart, a high-pressure line having a load-bearing shell and a sealing inner cladding, and a coupling, said coupling comprising a flange section having a ring part with an inner ring part surface with an axially extending outer sealing surface (32), a continuous recess having an abutment surface which extends radially outwards with respect to the inner ring part surface, said continuous recess being delimited by an axially extending recess surface and the axially extending outer sealing surface having a radius which is at most equal to the radius of the axially extending recess surface, a first stop face provided on an axially outermost end of the flange section, and a flange, the flange extending radially outwards with respect to the ring part and turned away from the high-pressure line, the load bearing shell being connected to the flange section, and a sealing element connecting the inner cladding to the flange section, said sealing element ending in the axially outermost free end of the flange section, the sealing element comprising i) a sealing sleeve having an outer sealing sleeve surface and an inner sealing sleeve surface, said sealing sleeve being situated between the inner cladding of the high-pressure line and the ring part of the flange section in such a way that the outer sealing sleeve surface faces the inner ring part surface and the inner sealing sleeve surface faces the cladding, and ii) a sealing collar which extends radially outwards with respect to the outer sealing sleeve surface, said sealing collar having a flat, radially extending sealing surface and forming a gasket which at least partially covers the axially outermost free end of the flange section, the sealing collar being accommodated in the continuous recess of the flange section and directly resting against the radially extending abutment surface of said continuous recess, and the flat, radially extending sealing surface of the sealing collar projecting in the axial direction beyond the first stop face to thereby obtain a sealing function, wherein the sealing sleeve and the sealing collar form a single entity made of plastic, and wherein an inner surface of the ring part has a radially inwardly projecting shoulder situated on an end of the ring part turned towards the high-pressure line, the projecting shoulder having a shoulder stop face turned away from the high-pressure line and against which stop face the sealing sleeve rests, and wherein said first stop face is arranged radially beyond and recessed axially with respect to the flat radially extending sealing surface of the sealing collar when sealing collar is in abutment with the counterpart and the flange section prior to the connecting structure being in a final assembled state, and the first stop face touches the counterpart when sealing collar is in abutment with the counterpart and the flange section when the connecting structure is in the final assembled state.

* * * * *